United States Patent [19]

Noland

[11] 3,784,785
[45] Jan. 8, 1974

[54] ELECTRICALLY HEATED FLUID CONDUIT COUPLER

[76] Inventor: Wayne B. Noland, 155 Jefferson, Carlisle, Iowa

[22] Filed: Sept. 20, 1971

[21] Appl. No.: 181,790

[52] U.S. Cl.............. 219/301, 137/341, 138/33, 174/47, 219/315, 219/535, 219/549, 285/46
[51] Int. Cl.................... H05b 3/58, F16l 53/00
[58] Field of Search .....................................
219/296–299, 301–305, 535, 549, 311, 315; 138/32, 33, 111; 137/341; 222/146 HE, 146 R; 338/214; 174/47; 285/46

[56] References Cited
UNITED STATES PATENTS

| 1,140,864 | 5/1915 | Aubery ................................ 138/33 |
| 1,921,709 | 8/1933 | Stecher ............................ 285/46 X |
| 2,758,150 | 8/1956 | Zargarpur .................... 219/301 UX |
| 3,378,673 | 4/1968 | Hopper ............................. 219/301 |
| 3,151,633 | 10/1964 | Shuman ...................... 219/301 UX |
| 2,578,280 | 12/1951 | Barnard ......................... 138/111 X |
| 3,269,422 | 8/1966 | Matthews et al............. 219/301 UX |
| 2,939,099 | 5/1960 | Morey.......................... 219/301 UX |
| 2,585,443 | 2/1952 | Cox................................. 338/214 X |
| 2,859,015 | 11/1958 | Spangler ..................... 219/301 UX |
| 2,750,487 | 6/1956 | Hynes............................. 138/33 X |
| 3,548,158 | 12/1970 | McCaskill .................... 219/301 UX |
| 3,120,600 | 2/1964 | True ................................. 219/301 |

FOREIGN PATENTS OR APPLICATIONS

| 527,759 | 10/1940 | Great Britain...................... 219/301 |
| 477,933 | 1/1938 | Great Britain....................... 174/47 |

Primary Examiner—A. Bartis
Attorney—Henderson & Strom

[57] ABSTRACT

A flexible conduit coupler for connecting a water source to a point of use, such as a house trailer, in conditions where the fluid is subjected to freezing temperatures. The coupler includes an elongated flexible heating conduit secured in side-by-side heat exchange contact with the major portion of the length of a flexible fluid conduit by spaced tape strips. A thermal insulation jacket surrounds the conduits. An electric resistance heating element is removable inserted into the heating conduit and is substantially coextensive in length therewith and can be replaced without disturbing the thermal insulation jacket. The ends of the coupler are provided with flexible protective boots to cover fittings and other hardware not protected by the thermal insulation jacket. An electric power supply cord having connectors on both ends can also be incorporated in the coupler.

1 Claim, 4 Drawing Figures

PATENTED JAN 8 1974  3,784,785

ELECTRICALLY HEATED FLUID CONDUIT COUPLER

BACKGROUND OF THE INVENTION

There are many situations where a fluid being conducted through a conduit must be protected from exposure to freezing conditions. Examples are water lines from a supply source to a trailer house, certain livestock watering systems, and fuel lines for industrial engines in certain situations.

Numerous systems have been developed for dealing with this problem. Most proposed solutions involve either insulating the conduit, wrapping the conduit with a heating element, or a combination of these. Most of the systems previously developed have been effective, but nevertheless have been subject to certain drawbacks and limitations.

For example, when insulation alone is relied on, it is sometimes not effective during prolonged periods of extreme cold, particularly when the fluid being conducted is moved through the conduit intermittently, such as is the case of a water line to a trailer house.

When heating elements wrapped about the conduits are used without additional insulation, the lack of insulation results in high heat losses and resulting high costs for electricity.

When heating elements wrapped about the conduit are covered with insulating material, a very effective and efficient system results. However, when the heating element requires replacement, the covering insulation must generally be destroyed to allow for removal of the heating element, resulting in substantial expense and effort to replace the heating element and the insulation.

Two prior art developments which have utilized a heating element wound around a conduit and covered with insulation are described in U.S. Pat. Nos. 3,275,803 and 3,378,673. It is apparent from examination of these devices that replacement of the heating element is a significant problem.

There has long been a need for a conduit heating means which is effective, efficient, and which allows for replacement of a defective heating element with a minimum of effort and without destroying the insulation surrounding the conduit.

SUMMARY OF THE INVENTION

This invention relates to an insulated, heated fluid conduit, and more particularly to fluid conduit couplers of the type adapted for conducting a fluid from a supply source to a point of use through conditions that would subject the fluid therein to freezing conditions.

In accordance with this invention, a fluid conducting conduit or coupler is provided with a receptacle, which is generally an elongated bendable piece of tubing, affixed to the outer surface of the fluid conducting conduit along a substantial length thereof. The receptacle may be taped or otherwise affixed to the conduit at several points along its length, and preferably is contiguous to the conduit along its length. An insulating material is provided covering both the conduit and the receptacle throughout substantially the entire length of both.

Heat is applied to the conduit by an elongated electrical heating element inserted in the receptacle. The coupler is so constructed that a burned out or defective heating element can be removed and replaced without removing or damaging the insulation covering the conduit and receptacle.

Preferably, the entire coupler, including conduit, receptacle, insulation and heating element, is bendable at least to the extent that it can be adapted to fit varying field conditions.

It is an object of this invention to provide an insulated conduit that can be heated by a heating element.

It is a further object to provide an insulated conduit that can be heated by an electrical heating element which can be easily replaced without disturbing the insulation of the conduit.

Further objects and advantages will be apparent from consideration of the following detailed description of a preferred embodiment.

DESCRIPTION OF THE PREFERRED EMBODIMENT

A preferred embodiment of this invention will be described as it applies to a coupler for connecting a water source to a trailer house, although it will be apparent that the invention is equally applicable to numerous other situations.

Figure 1:
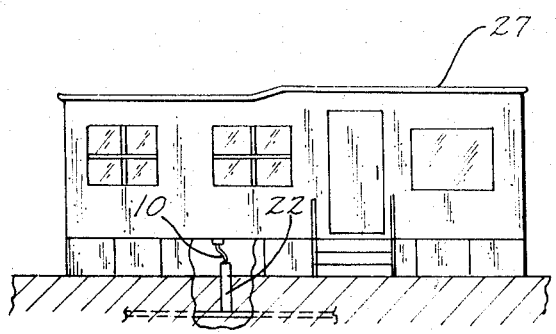
FIG. 1 is a side elevation showing a mobile home and a water source coupled by the invention.
Figure 3:
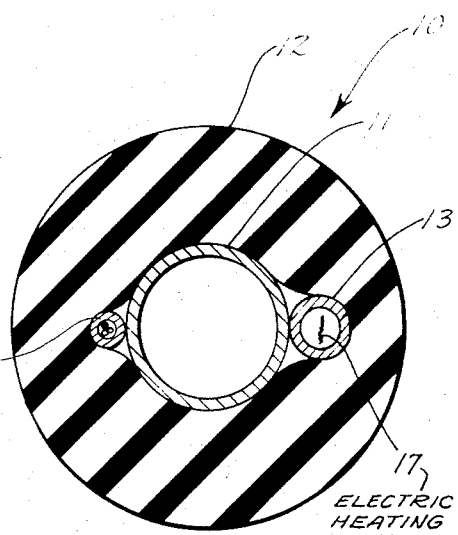
FIG. 3 is an enlarged cross section taken along the lines 3—3 of FIG. 2.

FIG. 1 shows a mobile home 27 located near a water supply pipe 22. The coupler 10 of this invention connects the mobile home 27 to the water supply pipe as will be described in detail below.

Figure 4:
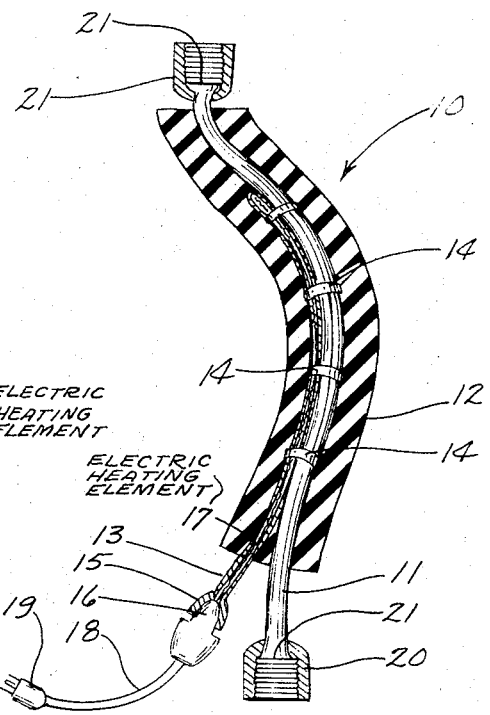
FIG. 4 is a side elevation, partially cut away, showing a preferred embodiment of the invention.

FIG. 4 shows the coupler 10 of this invention. A fluid conduit 11, preferably of a bendable metal such as soft copper of one quarter to one inch diameter, is encased by a covering of insulation 12. The insulation material may be any one of many currently available. A slightly flexible polyurethane foam material having a water impervious outer skin is one example of preferred insulation. The insulation is preferably in one piece with a central opening to provide maximum protection against moisture.

An elongated receptacle 13 is shown attached to conduit 11 by strips of tape 14 such that the receptacle contacts a line along the outer surface of the conduit 11 over a substantial length. The receptacle 13 is preferably a flexible copper tube of about one quarter inch diameter winh an enlarged section 15 adapted to receive a sealing plug 16 which has an insertable resistance heating element 17 extending from the plug 16 into receptacle 13. A cord 18 and connector 19 extend from the other end of sealing plug 16 for connection to a source of electricity. it has been found that a heater element of as low as 10 watts output will adequately perform in most winter conditions with a coupler of up to about 6 feet in length. A 30 watt heater is adequate even for severe cold conditions in most cases. The enlarged section 15 of receptacle 13 and the plug 16 of heater 17 are not necessary for operation of the device, but they provide a considerable convenience in use of the coupler and also serve to keep water out of the receptacle 13.

The ends of the conduit 11 are shown with fittings 20 which cooperate with flared portions 21 and a suitable mating fitting for coupling a water supply source and a point of use.

Figure 2:
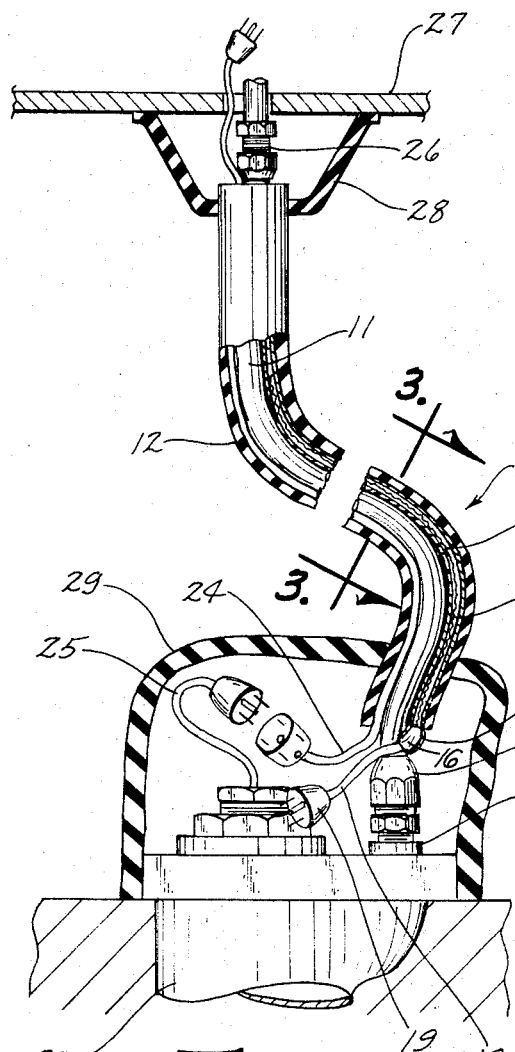
FIG. 2 is an enlarged side elevation, partially cut away, showing the coupler of the invention connecting a water source to a place of use.

FIG. 2 illustrates a preferred manner of using the coupler of this invention. A water supply pipe 22 extends into the ground, generally to below the frost line, and is in fluid communication with an outlet 23 connected to a fitting 20 of the coupler. An electrical heater can be associated with this water supply pipe in the manner described, for example, in U.S. Pat. No. 3,120,600. An electrical line 24, which may also run through the opening in the insulation 12 for convenience, has multiple sockets for connection of the water supply heater cord 25 as well as connector 19 of heater 17.

The conduit 11 extends from the water supply pipe 22 to a fitting 26 in mobile home 27 where it is connected by suitable fittings. Insulating boots 28 and 29 are attached to mobile home 27 and water supply pipe 22 to cover the fittings and other hardware not protected by the insulation 12. The heater 17 is inserted in receptacle 13 as described above and when connected to electrical line 24 provides heat to the coupler, so long as the electrical line 24 is plugged into an active outlet such as inside the mobile home.

It can be seen that while the device of this invention functions in a manner quite similar to other coupler heaters, nevertheless a significant advantage is obtained due to the fact that in the event of failure of the heater 17, the malfunctioning heater can be removed from receptacle 13 without disturbing the insulation 12, and a new heating element can be substituted with a minimum of effort. Since most heater failures are first noticed during severe cold conditions, the advantage of being able to replace the heater quickly without removing or destroying the insulation is apparent.

While the above description of a preferred embodiment of the invention illustrates a preferred version of the invention as adapted to a coupler between a water source and a mobile home, it will be apparent that numerous modifications and variations in the device can be made, and the device can be adapted to other types of fluid conduits, without departing from the true scope of the invention, which is to be defined by the appended claims.

I claim:

1. For use in fluidly coupling a source of fluid to the delivery conduit of a device using the fluid, the coupling exposed to all weather conditions:

a first insulating boot adapted for connection to the device using the fluid.

a second insulating boot adapted for connection to the source of fluid;

a flexible fluid conduit fluidly connected at one end to the delivery conduit of said device using the fluid and at the other end to the source of fluid;

a flexible hollow heating conduit having a length approximate that of said fluid conduit;

an electric heating element removably inserted into said heating conduit and extending the approximate length thereof;

spaced tape means securing said heating conduit and said fluid conduit together such that they are in side-by-side heat exchange contact;

a thermal insulation conduit embracing said conduits their entire lengths, said insulation conduit adapted to extend at one end into said first boot, and at the other end into said second boot; and electric means also adapted to be disposed in one of said boots for connecting said heating element to electric energy.

* * * * *